United States Patent
Thompson

(10) Patent No.: US 10,586,357 B2
(45) Date of Patent: Mar. 10, 2020

(54) GENERATING VALID POLYGON DATA BASED ON INPUT DATA WITH ERRORS

(71) Applicant: Mapbox, Inc., San Francisco, CA (US)

(72) Inventor: Mackenzie Blake Thompson, Oklahoma City, OK (US)

(73) Assignee: MAPBOX, INC., San Francisco, CA (US)

( * ) Notice: Subject to any disclaimer, the term of this patent is extended or adjusted under 35 U.S.C. 154(b) by 0 days.

(21) Appl. No.: 16/004,389

(22) Filed: Jun. 10, 2018

(65) Prior Publication Data

US 2018/0357797 A1   Dec. 13, 2018

Related U.S. Application Data

(60) Provisional application No. 62/519,095, filed on Jun. 13, 2017.

(51) Int. Cl.
*G06T 11/20* (2006.01)

(52) U.S. Cl.
CPC ........ *G06T 11/203* (2013.01); *G06T 2210/21* (2013.01)

(58) Field of Classification Search
CPC .................................................... G06T 11/203
USPC ......................................................... 345/443
See application file for complete search history.

(56) References Cited

PUBLICATIONS

Hugo Ledoux, A triangulation-based approach to automatically repair GIS polygons 2014, Computers &Geosciences, 66 (2014), 121-131.*

Bala R. Vatti, A Generic Solution to Polygon Clipping year 1992, Communications of the ACM, Jul. 1992/vol. 35 No. 7, 57-63.*

Agoston, M.K., *Computer Graphics and Geometric Modeling: Implementation and Algorithms*, 1st Edition, Springer-Verlag London Ltd., Jan. 4, 2005, 971 pages.

Herring, J.R., "Opens® Implementation Standard for Geographic information—Simple feature access—Part 1: Common architecture," Open Geospatial Consortium Inc., Version 1.2.1, 2011, 93 pages.

* cited by examiner

*Primary Examiner* — Hai Tao Sun
(74) *Attorney, Agent, or Firm* — Fenwick & West LLP

(57) ABSTRACT

A polygon Boolean operation and topology correction algorithm generates valid polygons despite polygon data containing self-intersecting polygons, overlapping polygons, polygons including a chain of holes, and/or polygons including complex intersections. A polygon Boolean operation and topology correction algorithm uses two variants of the Vatti algorithm along with a topology correction algorithm to address problematic areas within input data, such as the overlapping area shared between one or more polygons or a polygon having no area at all. Upon performing a variant of the Vatti algorithm to identify hot pixels within an arrangement of polygons, the polygon Boolean operation and topology correction algorithm runs a second variant of the Vatti algorithm to generate polygons within an integer coordinate system using snap-rounding. Snap-rounded polygons are then analyzed by a topology correction algorithm that ensures the proper winding order is followed to render valid polygons for display in an electronic map.

16 Claims, 11 Drawing Sheets

900

Receive first set of points defining first polygon.
910

Receive second set of points defining second polygon.
920

Determine set of one or more hot pixels.
930

Operate on first polygon with second polygon to generate one or more polygon rings.
940

Correct topology associated with the one or more polygon rings.
950

Provide corrected polygon rings to display device.
960

FIG. 9

GENERATING VALID POLYGON DATA BASED ON INPUT DATA WITH ERRORS

CROSS-REFERENCE TO RELATED APPLICATION

This application claims the benefit of U.S. Provisional Application No. 62/519,095, filed Jun. 13, 2017, which is hereby incorporated by reference in its entirety.

BACKGROUND

This disclosure relates generally to techniques for generating valid polygon data for graphical display on a display screen of a computing device, particularly where input data used to generate the polygons includes errors.

Electronic maps are becoming increasingly used to represent spatial aspects of a given geographic area. These maps are often comprised of polygons arranged within a coordinate system to provide a user with an accurate representation of buildings, major road arteries, or other points of interest. Polygons may be used to represent objects, for example physical locations within an electronic map. In order to generate polygons for display, polygon Boolean operation algorithms, such as the Vatti algorithm, can be implemented to improve the quality of polygon data representing areas within the electronic map. In particular, polygon Boolean operation algorithms can improve the quality of polygon data where polygons overlap. Polygon Boolean operation algorithms (e.g., polygon clipping algorithms) often operate on a first polygon, or "subject polygon," using a second polygon, or "operating polygon," to perform various Boolean operation types (e.g., intersection, union, difference, and exclusive-or). However, existing polygon Boolean operation algorithms do not account for numerous edge cases associated with polygon Boolean operations. For example, polygons that intersect themselves (e.g., self-intersecting polygons), polygons that intersect each other, polygons that include one or more intersecting interior polygons, or "holes," (e.g., chain of holes), and/or polygons that include complex intersections are often ambiguously processed by polygon Boolean operation algorithms to produce invalid polygons.

SUMMARY

Disclosed is a polygon Boolean operation and topology correction algorithm that differs from existing solutions in its ability to generate valid polygons despite polygon data containing self-intersecting polygons, overlapping polygons, polygons including a chain of holes, and/or polygons including complex intersections. The polygon Boolean operation and topology correction algorithm accounts for these edge cases by implementing a variation of the Vatti algorithm in tandem with a topology correction algorithm used to ensure the accurate representation of ambiguous areas within an electronic map, such as the overlapping area shared between one or more polygons or a polygon having no area at all (e.g., spikes). More specifically, upon performing a first variant of the Vatti algorithm to identify intersections, or "hot pixels," within an arrangement of polygons, the polygon Boolean operation and topology correction algorithm runs a second variant of the Vatti algorithm. Running the first variant of the Vatti algorithm followed by the second variant of the Vatti algorithm generates polygons within an integer coordinate system using snap-rounding. Snap-rounded polygons are then analyzed by a topology correction algorithm that ensures the proper winding order is followed to render valid polygons for display.

BRIEF DESCRIPTION OF THE DRAWINGS

The teachings of the embodiments can be readily understood by considering the following detailed description in conjunction with the accompanying drawings.

FIG. 9 is a flowchart that illustrates an example process for topology correction, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Environment

Figure 1:
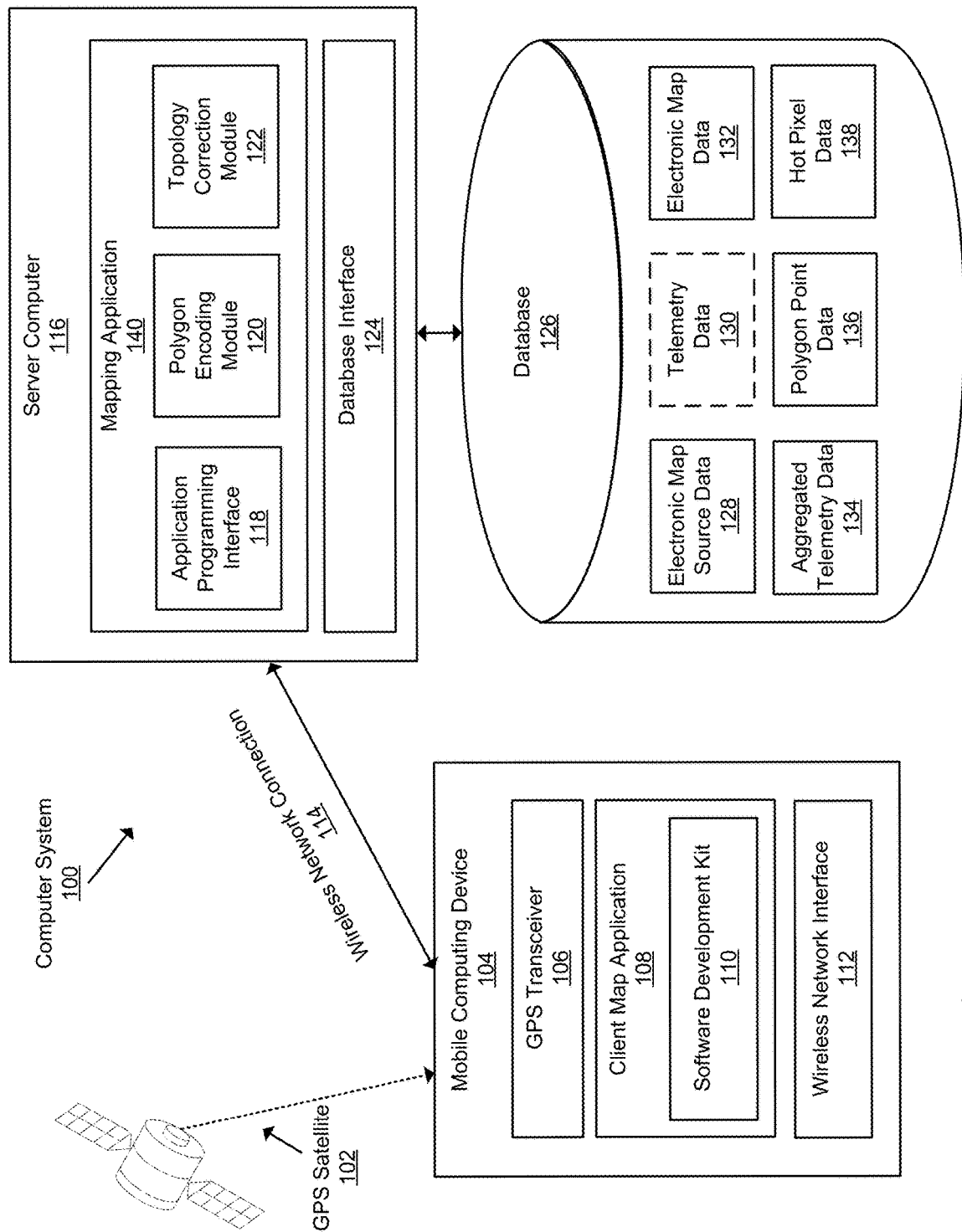
FIG. 1 illustrates an example computer system in which the techniques described may be practiced, according to one embodiment.

FIG. 1 illustrates an example computer system 100 in which the techniques described may be practiced, in accordance with an embodiment. In the embodiment illustrated in FIG. 1, the computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 104 that is coupled via a wireless network connection 114 to a server computer 116, which is coupled to a database 126. A GPS satellite 102 is coupled via a wireless connection to the mobile computing device 104. The server computer 116 comprises a mapping application 140, application programming interface (API) 118, polygon encoding module 120, topology correction module 122, and database interface 124. The database 126 comprises electronic map source data 128, telemetry data 130, electronic map data 132, aggregated telemetry data 134, polygon point data 136, and hot pixel data 138. The mobile computing device 104 comprises a GPS transceiver 106, client map application 108, software development kit (SDK) 110, and wireless network interface 112.

Server Computer

Server computer 116 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 116 broadly represents one or multiple server computers, such as a server cluster, and the server computer may be located in one or more physical locations. Server computer 116 also may represent one or more virtual computing instances that execute using one or more computers in a datacenter such as a virtual server farm.

Server computer 116 is communicatively connected to database 126 and mobile computing device 104 through any kind of computer network using any combination of wired and wireless communication, including, but not limited to: a Local Area Network (LAN), a Wide Area Network (WAN), one or more internetworks such as the public Internet, or a company network. Server computer 116 may host or execute mapping application 140, and may include other applications, software, and other executable instructions, such as database interface 124, to facilitate various aspects of embodiments described herein.

In one embodiment, mapping application 140 comprises program instructions that are programmed or configured to perform a variety of backend functions needed for electronic mapping including, but not limited to: sending electronic map data 132 to mobile computing devices, receiving telemetry data 130 from mobile computing devices, processing telemetry data 130 to generate aggregated telemetry data 134, receiving electronic map source data 128 from data providers, processing electronic map source data 128 to generate electronic map data 132, generate polygon point data 136, identify hot pixel data 138, and any other aspects of embodiments described herein. In the embodiment illustrated in FIG. 1, the mapping application 140 includes an API 118, a polygon encoding module 120, and a topology correction module 122. In other embodiments, the mapping application 140 may include additional, fewer, or different components for various applications.

In one embodiment, the polygon encoding module 120 receives polygon point data 136 in integer coordinate form. The polygon encoding module 120 initially performs a pass of a first variant of the Vatti algorithm, and subsequently performs a pass of a second variant of the Vatti algorithm on the received data to generate polygon rings within an integer coordinate system. For example, the polygon encoding module 120 performs the first variant of the Vatti algorithm to identify "hot pixels." Upon completing the first variant of the Vatti algorithm, the polygon encoding module 120 then performs a pass of the second variant of the Vatti algorithm adding points to lines that cross hot pixels, or "snap-rounding," while performing the Boolean operation. In one embodiment, a hot pixel describes a pixel within a vector tile that includes intersecting edges, or bounds, belonging to one or more polygon rings. Hot pixels also include pixels that contain the vertices of one or more polygon rings. For example, if two polygon rings intersect one another in two locations within a vector tile, the pixels that contain the intersections (as well as the vertices of the two polygon rings) are designated as hot pixels.

During a pass of the first variant of the Vatti algorithm, the polygon encoding module 120 identifies hot pixels within a vector tile, and creates a hot pixel list that includes the pixel locations of intersecting bounds and polygon ring vertices. This hot pixel list is stored as hot pixel data 138 in the database 126 of the computer system 100. In one embodiment, hot pixel data 138 is stored as integer coordinates (e.g., pairs of integers used to determine points in a grid).

During a pass of the second variant of the Vatti algorithm, the polygon encoding module 120 adds points making up the resulting polygon ring, or polygon rings, while performing the Boolean operation. This process is similar to the process described in Max K. Agoston, *Computer Graphics and Geometric Modeling: Implementation and Algorithms*, $1^{st}$ Edition, p. 98-106, Jan. 4, 2005, which is hereby incorporated by reference in its entirety. When selecting the points for inclusion in the resulting polygon ring, the polygon encoding module 120 uses the hot pixel data 138 generated during the pass of the first variant of the Vatti algorithm to determine if additional points should be added to the resulting polygon ring. If the line created by a point selected for inclusion and the previous point in the resulting polygon ring passes through a hot pixel, the polygon encoding module 120 creates an additional point for inclusion in the resulting polygon ring. This process effectively snap-rounds the polygons while conducting the requested Boolean operation (i.e., intersection, union, difference, or exclusive-or). By snap-rounding a polygon ring, or polygon rings, into an integer coordinate system, the mapping application 140 can avoid precision errors such as those associated with performing calculations using floating-point values. Updated polygon ring point data 136 is stored in database 126.

Although snap-rounding produces polygon rings with vertices located at integer coordinates, the process may slightly alter the shape of the polygon ring, or polygon rings. Thus it is possible to have rings that self-intersect by having two points at the same position and/or invalid areas that require subsequent topology correction in order to produce a valid polygon (e.g., snipping one or more spikes).

In one embodiment, topology correction module 122 corrects invalid areas within a polygon ring in order to generate valid polygon rings subsequent to snap-rounding. The topology correction module 122 uses rules to define ambiguous areas within a polygon ring, such as those found in self-intersecting polygon rings, overlapping polygon rings, polygon rings including a chain of holes, and/or polygon rings that include complex intersections, for example. The topology correction module 122 traces the edges of each polygon ring until an intersection is located. Upon detecting an intersection, the topology correction module 122 assigns the correct winding order within the intersection to generate one or more valid polygons rings. A valid polygon has one exterior ring and zero or more interior rings. To be considered a valid polygon or set of valid polygons (multipolygons), each polygon interior ring must be oriented with the winding order opposite that of its parent exterior ring and must be completely contained within its parent exterior ring. In one embodiment, a valid polygon ring may be defined as a polygon ring that does not include a self-intersection at a discrete point, does not an include an interior ring that intersects an exterior ring at two or more discrete points, and/or does not include a series of two or more interior rings that intersect an exterior ring at two or more discrete points. If a polygon ring exhibits any of these characteristics, the polygon ring is determined to be invalid, thus requiring topology correction to generate a valid polygon.

In one embodiment, database interface 124 is a programmatic interface such as JDBC or ODBC for communicating with database 126. Database interface 124 may communicate with any number of databases and any type of database, in any format. Database interface 124 may be a piece of custom software created by an entity associated with mapping application 140, or may be created by a third party entity in part or in whole.

Database

In one embodiment, database 126 is a data storage subsystem consisting of programs and data that is stored on any suitable storage device such as one or more hard disk drives, memories, or any other electronic digital data recording device configured to store data. Although database 126 is depicted as a single device in FIG. 1, database 126 may span multiple devices located in one or more physical locations. For example, database 126 may include one or more nodes located at one or more data warehouses. Additionally, in one embodiment, database 126 may be located on the same device or devices as server computer 116. Alternatively, database 126 may be located on a separate device or devices from server computer 116.

Database 126 may be in any format, such as a relational database, a noSQL database, or any other format. Database 126 is communicatively connected with server computer 116 through any kind of computer network using any combination of wired and wireless communication of the type previously described. Optionally, database 126 may be communicatively connected with other components, either directly or indirectly, such as one or more third party data suppliers. Generally, database 126 stores data related to electronic maps including, but not limited to: electronic map source data 128, telemetry data 130, electronic map data 132, aggregated telemetry data 134, polygon point data 136, and hot pixel data 138. These datasets may be stored as columnar data in a relational database or as flat files.

In one embodiment, electronic map source data 128 is raw digital map data that is obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 128 may be updated at any suitable interval, and may be stored for any amount of time. Once obtained or received, electronic map source data 128 is used to generate electronic map data 132.

In one embodiment, electronic map data 132 is digital map data that is provided, either directly or indirectly, to client map applications, such as client map application 108, using an API, such as API 118. Electronic map data 132 is based on electronic map source data 128. Specifically, electronic map source data 128 is processed and organized as a plurality of vector tiles which may be subject to style data to impose different display styles. Electronic map data 132 may be updated at any suitable interval, and may include additional information beyond that derived from electronic map source data 128. For example, using aggregated telemetry data 134, discussed below, a variety of additional information may be stored in the vector tiles, such as traffic patterns, turn restrictions, detours, common or popular routes, speed limits, new streets, and any other information related to electronic maps or the use of electronic maps.

In one embodiment, telemetry data 130 is digital data that is obtained or received from mobile computing devices via function calls that are included in a Software Development Kit (SDK) 110 that application developers use to integrate and include electronic maps in applications. As indicated by the dotted lines, telemetry data 130 may be transiently stored, and is processed as discussed below before storage as aggregated telemetry data 134.

The telemetry data 130 may include mobile device location information based on GPS signals. For example, telemetry data 130 may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp.

In one embodiment, aggregated telemetry data 134 is telemetry data 130 that has been processed using anonymization, chunking, filtering, or a combination thereof. Anonymization may include removing any data that identifies a specific mobile device or person. Chunking may include segmenting a continuous set of related telemetry data 130 into different segments or chunks representing portions of travel along a route. For example, telemetry data 130 may be collected during a drive from John's house to John's office. Chunking may break that continuous set of telemetry data 130 into multiple chunks so that, rather than consisting of one continuous trace, John's trip may be from John's house to point A, a separate trip from point A to point B, and another separate trip from point B to John's office. Chunking may also remove or obscure start points, end points, or otherwise break telemetry data 130 into any size. Filtering may remove inconsistent or irregular data, delete traces or trips that lack sufficient data points, or exclude any type or portion of data for any reason. Once processed, aggregated telemetry data 134 is stored in association with one or more tiles related to electronic map data 132. Aggregated telemetry data 134 may be stored for any amount of time, such as a day, a week, or more. Aggregated telemetry data 134 may be further processed or used by various applications or functions as needed.

In one embodiment, polygon point data 136 is comprised of discrete, ordered sets of points describing edges, or bounds, of one or more polygon rings. In one embodiment, polygon point data 136 may be derived from electronic map source data 128 in database 126. In another embodiment, polygon point data 136 may be generated based on satellite imagery. The polygon encoding module 120 uses polygon point data 136 to generate one or more polygon rings that describe the topography of a given geographic area. Polygon point data 136 may be updated to include integer coordinate locations assigned to one or more polygon rings that include hot pixel points from snap-rounding. In one embodiment, polygon point data 136 is a data structure that maps discrete points comprising a polygon ring to corresponding pixels within a vector tile. In this embodiment, updated polygon point data 136 simply overwrites the previous point values to include integer coordinates from snap-rounding.

In one embodiment, hot pixel data 138 is comprised of a list of hot pixels used by the polygon encoding module 120 for snap-rounding. Pixels within the vector tile that include an intersection of polygon rings and/or polygon ring vertices are designated as hot pixels, and are added to the hot pixel list. The hot pixel list is stored as hot pixel data 138 in database 126.

Mobile Computing Device

In one embodiment, mobile computing device 104 is any mobile computing device, such as a laptop computer, handheld computer, wearable computer, cellular or mobile phone, portable digital assistant (PDAs), or tablet computer. Although a single mobile computing device is depicted in FIG. 1, any number of mobile computing devices may be present. Each mobile computing device 104 is communicatively connected to server computer 116 through wireless network connection 114 which comprises any combination of a LAN, a WAN, one or more internetworks such as the public Internet, a cellular network, or a company network.

Mobile computing device 104 is communicatively coupled to GPS satellite 102 using GPS transceiver 106. GPS transceiver 106 is a transceiver used by mobile computing device 104 to receive signals from GPS satellite 102, which broadly represents three or more satellites from which the mobile computing device may receive signals for resolution into a latitude-longitude position via triangulation calculations.

Mobile computing device 104 also includes wireless network interface 112 which is used by the mobile computing device to communicate wirelessly with other devices. In particular, wireless network interface 112 is used to establish wireless network connection 114 to server computer 116. Wireless network interface 112 may use WiFi, WiMAX, Bluetooth, ZigBee, cellular standards, or others.

Mobile computing device 104 also includes other hardware elements, such as one or more input devices, memory, processors, and the like, which are not depicted in FIG. 1. Mobile computing device 104 also includes applications, software, and other executable instructions to facilitate various aspects of embodiments described herein. These applications, software, and other executable instructions may be installed by a user, owner, manufacturer, or other entity related to mobile computing device. In one embodiment, mobile computing device 104 includes client map application 108 which is software that displays, uses, supports, or otherwise provides electronic mapping functionality as part of the application or software. Client map application 108 may be any type of application, such as a taxi service, a video game, a chat client, a food delivery application, etc. In an embodiment, client map application 108 obtains electronic mapping functions through SDK 110, which may implement functional calls, callbacks, methods or other programmatic means for contacting the server computer to obtain digital map tiles, layer data, or other data that can form the basis of visually rendering a map as part of the application. In general, SDK 110 is a software development kit that allows developers to implement electronic mapping without having to design all of the components from scratch. For example, SDK 110 may be downloaded from the Internet by developers, and subsequently incorporated into an application which is later used by individual users.

In server computer 116, the mapping application 140 provides the API 118 that may be accessed, for example, by client map application 108 using SDK 110 to provide electronic mapping to client map application 108. Specifically, mapping application 140 comprises program instructions that are programmed or configured to perform a variety of backend functions needed for electronic mapping including, but not limited to: sending electronic map data 132 to mobile computing devices, receiving telemetry data 130 from mobile computing devices, processing telemetry data 130 to generate aggregated telemetry data 134, receiving electronic map source data 128 from data providers, processing electronic map source data 128 to generate electronic map data 132, and any other aspects of embodiments described herein.

According to one embodiment, the techniques described herein are implemented by one or more special-purpose computing devices. For example, the server computer 116 and mobile computing device 104 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

System Architecture

Figure 2:
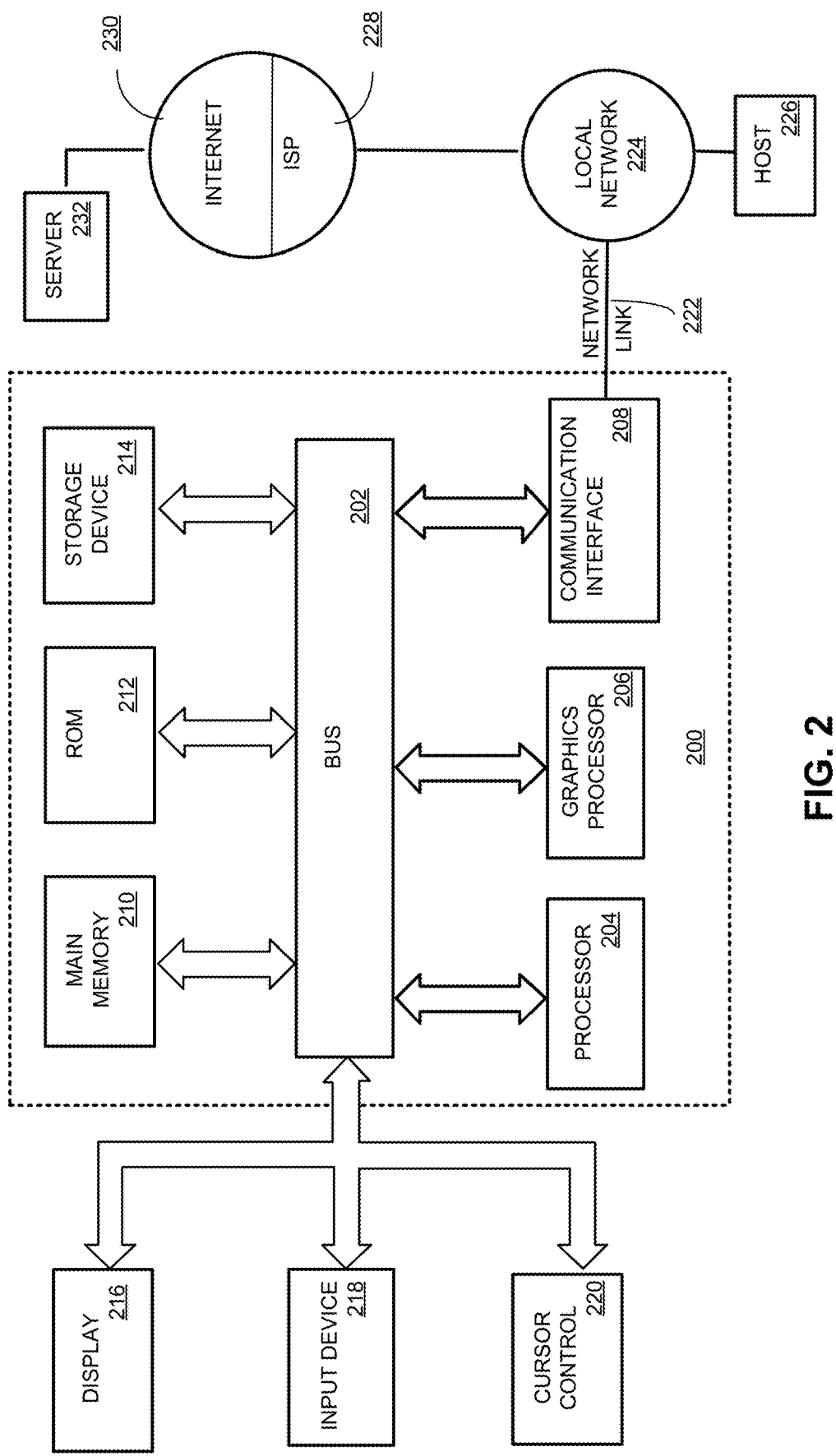
FIG. 2 is a block diagram that illustrates a computer system upon which an embodiment of the invention may be implemented, according to one embodiment.

FIG. 2 is a block diagram that illustrates a computer system 200 upon which an embodiment of the invention may be implemented. Computer system 200 includes a bus 202 or other communication mechanism for communicating information, and a hardware processor (CPU) 204 and graphics processor (GPU) 206 coupled with bus 202 for processing information. CPU 204 may be, for example, a general purpose microprocessor. GPU 206 may be, for example, a graphics processing unit with a high core count which is optimized for parallel processing and graphics rendering.

Computer system 200 also includes a main memory 210, such as a random access memory (RAM) or other dynamic storage device, coupled to bus 202 for storing information and instructions to be executed by CPU 204. Main memory 210 also may be used for storing temporary variables or other intermediate information during execution of instructions to be executed by CPU 204 and/or GPU 206. Such instructions, when stored in non-transitory storage media accessible to CPU 204 and/or GPU 206, render computer system 200 into a special-purpose machine that is customized to perform the operations specified in the instructions.

Computer system 200 further includes a read only memory (ROM) 212 or other static storage device coupled to bus 202 for storing static information and instructions for CPU 204 and/or GPU 204. A storage device 214, such as a magnetic disk or optical disk, is provided and coupled to bus 202 for storing information and instructions.

Computer system 200 may be coupled via bus 202 to a display 216, such as an LCD screen, LED screen, or touch screen, for displaying information to a computer user. An input device 218, which may include alphanumeric and other keys, buttons, a mouse, a touchscreen, and/or other input elements is coupled to bus 202 for communicating information and command selections to CPU 204 and/or GPU 206. In some embodiments, the computer system 200 may also include a cursor control 220, such as a mouse, a trackball, or cursor direction keys for communicating direction information and command selections to CPU 204 and/or GPU 206 and for controlling cursor movement on display 216. The cursor control 220 typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and program logic which in combination with the computer system causes or programs computer system 200 to be a special-purpose machine. According to one embodiment, the techniques herein are performed by computer system 200 in response to CPU 204 and/or GPU 206 executing one or more sequences of one or more instructions contained in main memory 210. Such instructions may be read into main memory 210 from another storage medium, such as storage device 214. Execution of the sequences of instructions contained in main memory 210 causes CPU 204 and/or GPU 206 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 214. Volatile media includes dynamic memory, such as main memory 210. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to CPU 204 and/or GPU 206 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 210, from which CPU 204 and/or GPU 206 retrieves and executes the instructions. The instructions received by main memory 210 may optionally be stored on storage device 214 either before or after execution by CPU 204 and/or GPU 206.

Computer system 200 also includes a communication interface 208 coupled to bus 202. Communication interface 208 provides a two-way data communication coupling to a network link 222 that is connected to a local network 224. For example, communication interface 208 may be an integrated services digital network (ISDN) card, cable modem, satellite modem, or a modem to provide a data communication connection to a corresponding type of telephone line. As another example, communication interface 208 may be a local area network (LAN) card to provide a data communication connection to a compatible LAN. Wireless links may also be implemented. In any such implementation, communication interface 208 sends and receives electrical, electromagnetic or optical signals that carry digital data streams representing various types of information.

Network link 222 typically provides data communication through one or more networks to other data devices. For example, network link 222 may provide a connection through local network 224 to a host computer 226 or to data equipment operated by an Internet Service Provider (ISP) 228. ISP 228 in turn provides data communication services through the world wide packet data communication network now commonly referred to as the "Internet" 230. Local network 224 and Internet 230 both use electrical, electromagnetic or optical signals that carry digital data streams. The signals through the various networks and the signals on network link 222 and through communication interface 208, which carry the digital data to and from computer system 200, are example forms of transmission media.

Computer system 200 can send messages and receive data, including program code, through the network(s), network link 222 and communication interface 208. In the Internet example, a server 232 might transmit a requested code for an application program through Internet 230, ISP 228, local network 224 and communication interface 208. The received code may be executed by CPU 204 and/or GPU 206 as it is received, and stored in storage device 214, or other non-volatile storage for later execution.

Example Variant Vatti Process

Figure 3A:
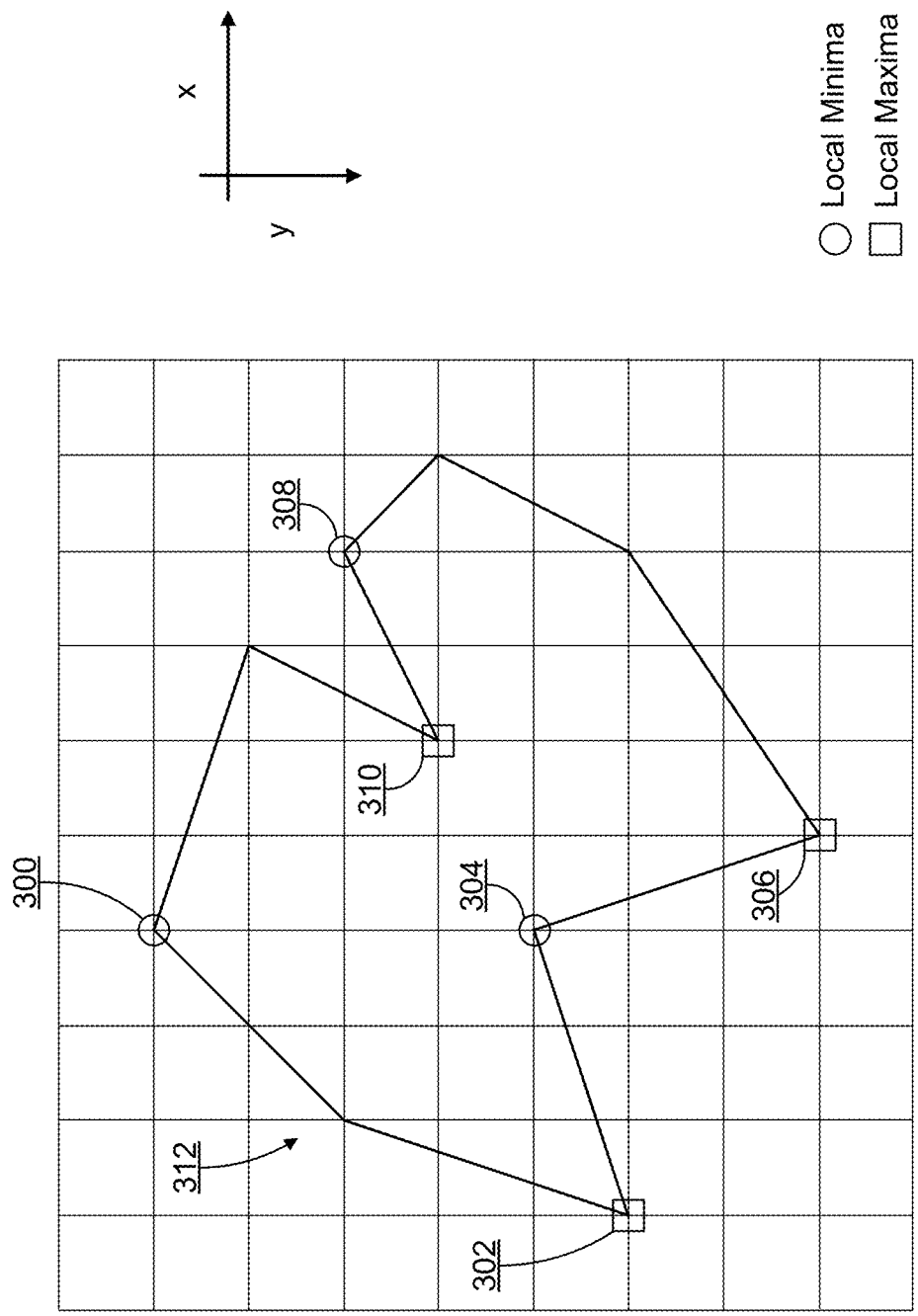
FIGS. 3A and 3B illustrate an example use case of creating bounds for a polygon ring using the Vatti algorithm, according to one embodiment.

FIG. 3A illustrates an example use case of identifying local minima and local maxima for a polygon ring, according to one embodiment. In the embodiment illustrated in FIG. 3A, the polygon encoding module 120 receives polygon point data 136 describing polygon ring 312. This polygon point data 136 is comprised of an ordered set of points that constitute each edge (i.e., line between two vertices) of polygon ring 312. In one embodiment, the polygon encoding module 120 uses the polygon point data 136 to identify local minima and local maxima for polygon ring 312 similar to the process described in Max K. Agoston, *Computer Graphics and Geometric Modeling: Implementation and Algorithms*, 1$^{st}$ Edition, p. 98-106, Jan. 4, 2005, which is hereby incorporated by reference in its entirety. In the embodiment shown in FIG. 3A, a local minimum is defined as a vertex in which both of the edges extending from the vertex (e.g., on the left and right sides) connect to vertices that are below the local minimum, such that no additional local minima will be located until a local maximum is located. Conversely, a local maximum is defined as a vertex in which both of the edges extending from the vertex connect to vertices that are above the local maximum. Local minima and local maxima are indicated in FIG. 3A by circles (e.g., 300, 304, and 308) and squares (e.g., 302, 306, and 310), respectively. Local minima and local maxima data is stored as polygon point data 136 in database 126.

Figure 3B:
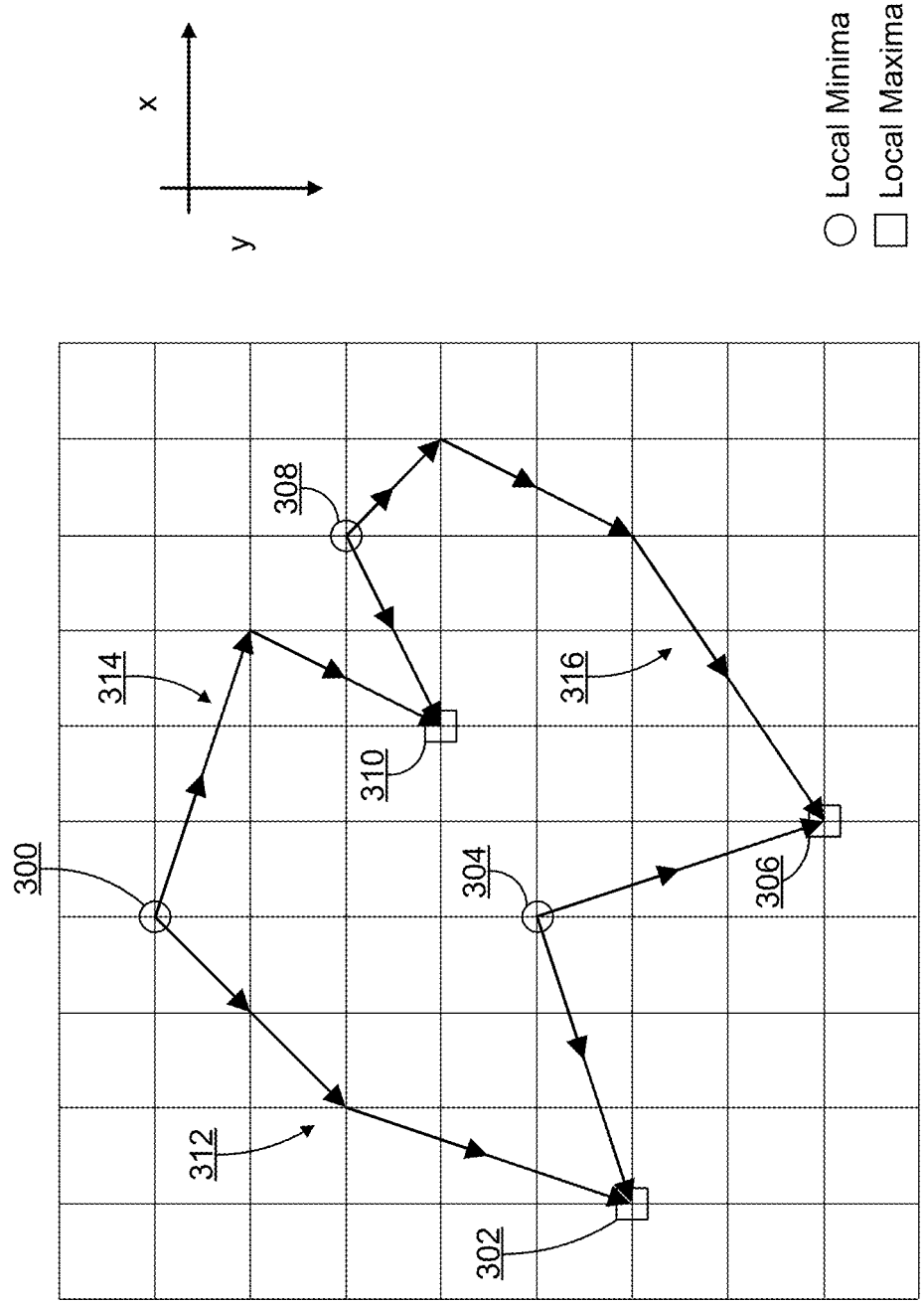

FIG. 3B illustrates an example use case of creating bounds for a polygon ring, according to one embodiment. In the embodiment illustrated in FIG. 3B, the polygon encoding module 120 uses local minima and local maxima data to create bounds for polygon ring 312 similar to the process described in Max K. Agoston, *Computer Graphics and Geometric Modeling: Implementation and Algorithms*, 1$^{st}$ Edition, p. 98-106, Jan. 4, 2005, which is hereby incorporated by reference in its entirety. Each bound illustrated in FIG. 3B starts at a local minimum and ends at a local maximum. For example, bound 314 begins at local minimum 300 and ends at local maximum 310. Similarly, bound 316 begins at local minimum 308 and ends at local maximum 306. Once bounds have been created for polygon ring 312, the polygon encoding module 120 traces each bound to identify bounds through which one or more additional bounds create an intersection. In the event two or more bounds form an intersection, the polygon encoding module 120 identifies the pixel, or pixels, in which the intersection occurs and adds the pixel to a list of hot pixels. In addition, the polygon encoding module 120 adds pixels containing vertices of polygon ring 312 to the hot pixel list. This hot pixel list is stored as hot pixel data 138 in database 126.

Example Snap-Rounding Process

Figure 4A:
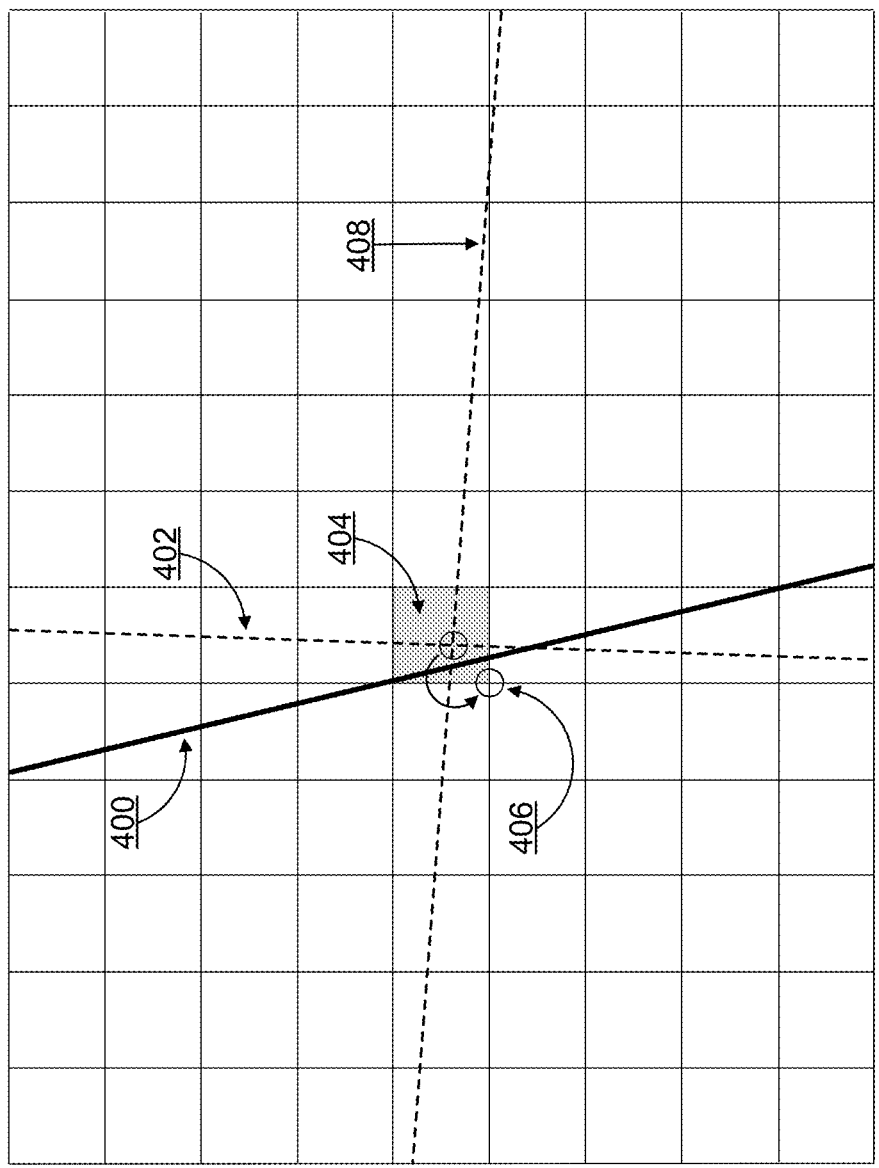
FIGS. 4A and 4B illustrate an example use case of snap-rounding intersecting lines within hot pixels, according to one embodiment.

FIG. 4A illustrates an example use case of locating a hot pixel within an integer coordinate system, according to one embodiment. In the example illustrated in FIG. 4A, integer coordinates are located at the intersections of each line comprising the grid. Dotted lines 402 and 408 represent polygon ring bounds that intersect within pixel 404. Line 400 represents a bound of an additional polygon ring that also intersects with bounds 402 and 408 within pixel 404. The polygon encoding module 120 identifies pixel 404 as a hot pixel that contains an intersection of bounds 400, 402, and 408, adds pixel 404 to a hot pixel list while performing a pass of the first variant of the Vatti algorithm, and stores the hot pixel list as hot pixel data 138 in database 126. In a subsequent pass of the second variant of the Vatti algorithm, the polygon encoding module 120 identifies the integer coordinate 406 closest to the intersection of the three bounds, and reassigns points comprising bounds 400, 402, and 404 to pass through integer coordinate 406. For example, discrete points that comprise intersecting bounds 400, 402, and 404 are reassigned to positions within the integer coordinate system that accommodate snap-rounding of each intersecting bound through integer coordinate 406. These reassigned point positions are stored as updated polygon point data 136 in database 126.

Figure 4B:
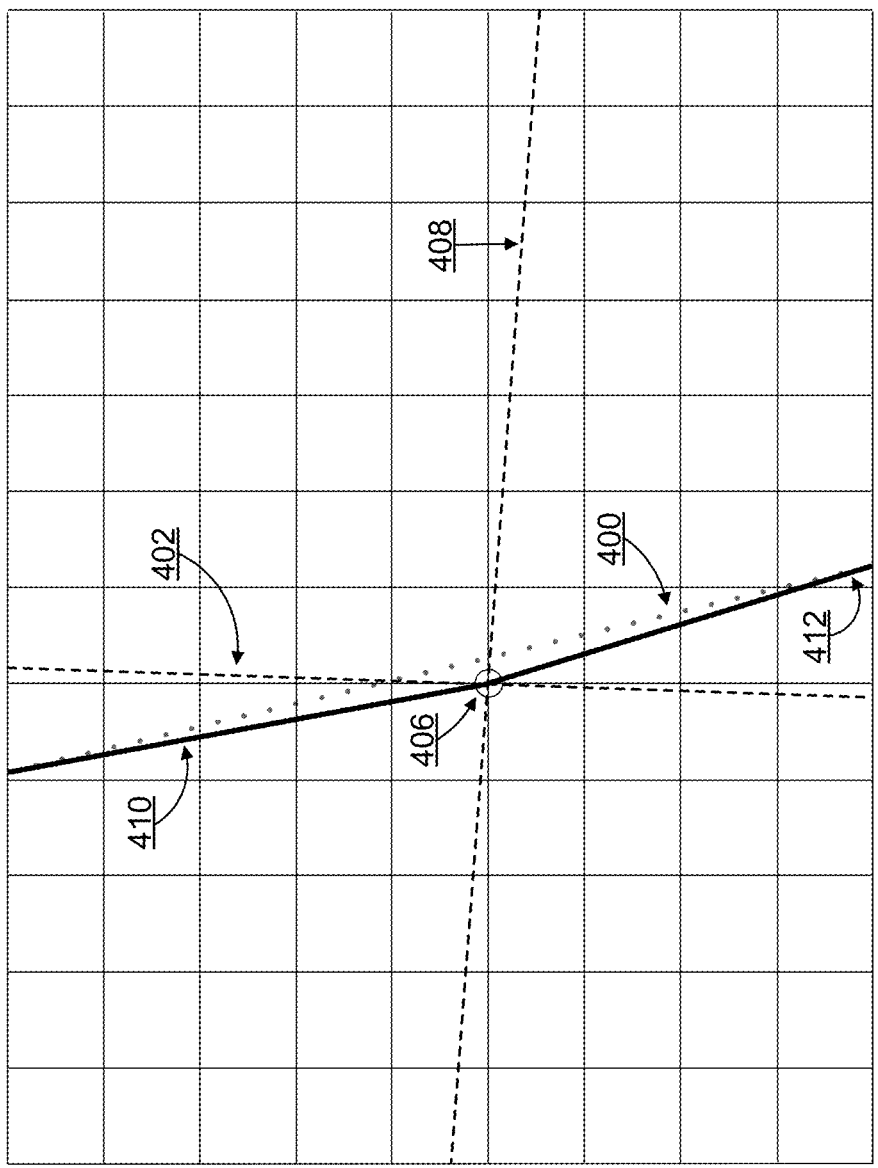

FIG. 4B illustrates an example of snap-rounding bounds within a hot pixel to pass through a nearest integer coordinate within an integer coordinate system, according to one embodiment. In the example shown in FIG. 4B, the intersecting bounds shown in FIG. 4A have been snap-rounded to integer coordinate 406 during the pass of the second variant of the Vatti algorithm. In the second variant of the Vatti algorithm, the polygon encoding module 120 creates updated bounds using the reassigned point positions for each intersecting bound stored as updated hot pixel data 138 during the pass of the first variant of the Vatti algorithm. To redirect each bound passing through a hot pixel to the nearest integer coordinate, the polygon encoding module 120 breaks one or more bounds into line segments. This is shown in FIG. 4B where the dotted line representing bound 400 (previously shown in FIG. 4A) has been broken into line segments 410 and 412 that each connect at integer coordinate 406. In addition, intersecting bounds 402 and 408 are snap-rounded to integer coordinate 406 based on the hot pixel point positions as determined during the pass of the first variant of the Vatti algorithm. As shown in FIG. 4B, breaking a bound into line segments to accommodate snap-rounding in an integer coordinate system may slightly alter the shape of the original polygon ring (e.g., line segments 410 and 412 compared to original bound 400).

Example Winding Order

Figure 5:
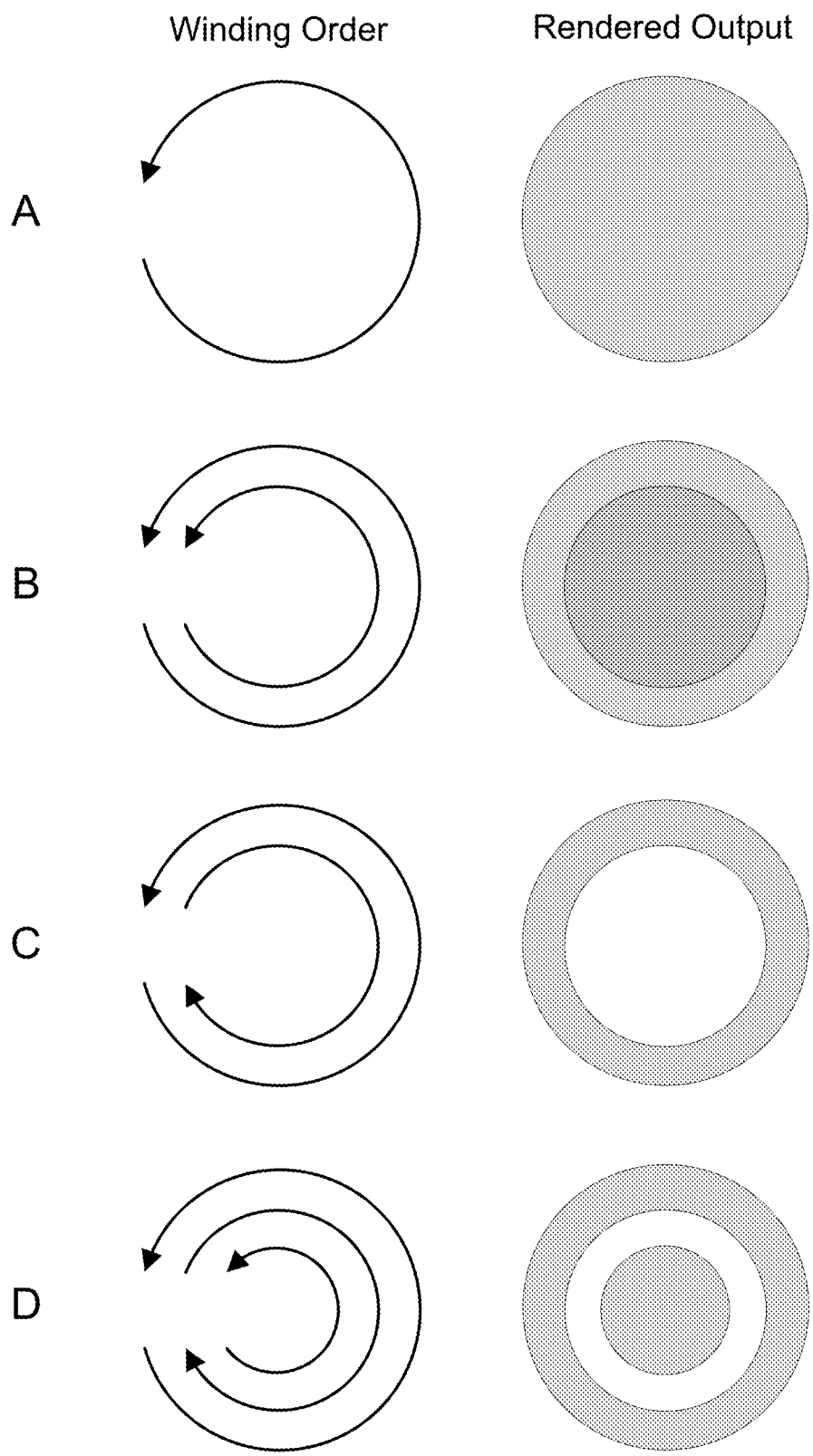
FIG. 5 illustrates an example use case of winding order, according to one embodiment.

FIG. 5 illustrates several examples of winding order and their respective rendered output, according to one embodiment. The winding order associated with a polygon ring describes the relative order in which points within the polygon ring are encoded, or drawn, into a vector tile for display to a user of client map application 108. This relative order can be either clockwise (CW) or counter-clockwise (CCW) in relation to the integer coordinate plane within the vector tile. Encoding a polygon ring with a correct winding order will result in a valid polygon when rendered. Conversely, encoding a polygon ring with an incorrect winding order will generate an invalid polygon and/or an unintended rendered output. To be considered a valid polygon, or set of valid polygons (e.g., multipolygons), each interior ring must be oriented with a winding order opposite that of its parent exterior ring and must be contained entirely within its parent exterior ring.

As shown in row A of FIG. 5, a single polygon ring that is drawn in CCW winding order is rendered as a single solid polygon. Similarly, row B includes two rings, an exterior ring and an interior ring, that are both drawn with a CCW winding order, resulting in two overlapping solid polygons. However, overlapping polygons of a multipolygon are considered invalid. Further, to the extent the interior ring is supposed to represent a "hole," this rendered output is invalid in that the interior ring is not oriented with an opposite winding order than that of its parent exterior ring. Row C generates a valid rendered output for exhibiting this characteristic. In row C, it is shown that the exterior ring is drawn with a CCW winding order (producing a solid polygon), and the interior ring is drawn with a CW winding order (producing a hole). As a result, the rendered output is a solid polygon with a hole in its center. Similarly, row D illustrates a multipolygon comprised of alternating winding orders that include a CCW exterior ring, a CW interior ring, and a CCW exterior ring of a second polygon that is small enough that it does not overlap the first polygon. The resulting rendered output is a valid set of multipolygons in that it does not contain overlapping polygons due to the alternating winding orders from the exterior ring to the interior ring, and the second exterior ring has no overlap with the exterior and interior rings of the first polygon.

Example Topology Correction Process

The traditional Vatti algorithm, similar to the process described in Max K. Agoston, *Computer Graphics and Geometric Modeling: Implementation and Algorithms*, 1$^{st}$ Edition, p. 98-106, Jan. 4, 2005, which is hereby incorporated by reference in its entirety, ensures that a path of a polygon ring will never cross over itself. Although the pass of the second variant of the Vatti algorithm performed by the polygon encoding module 120 maintains this guarantee, snap-rounded polygon rings may be invalid. For example, a polygon ring may be collinear with another polygon ring, contain a self-intersection at a discrete point, include an interior ring that intersects the exterior ring at two or more discrete points, and/or contain a series of two or more interior rings that intersect the exterior ring at two or more discrete points.

Upon identifying an intersection, the topology correction module 122 ensures that the winding order used to encode intersecting polygon rings results in a valid rendered output of the desired Boolean operation type (e.g., intersection, union, difference, XOR, etc.). The topology correction module 122 accomplishes this by maintaining a record of its current encoding position, as well as its previous position and next position (e.g., double linked list), using polygon point data 136 from the database 126. Because these positions are known, the topology correction module 122 can swap a next position that would result in invalid rendered output with a next position that generates a valid polygon. The topology correction module 122 incrementally steps through each point position of each polygon ring, or polygon rings, and identifies paths in which a proper winding order is maintained. The following sections provide examples of this process.

Self-Intersecting Polygon Ring

Figure 6A:
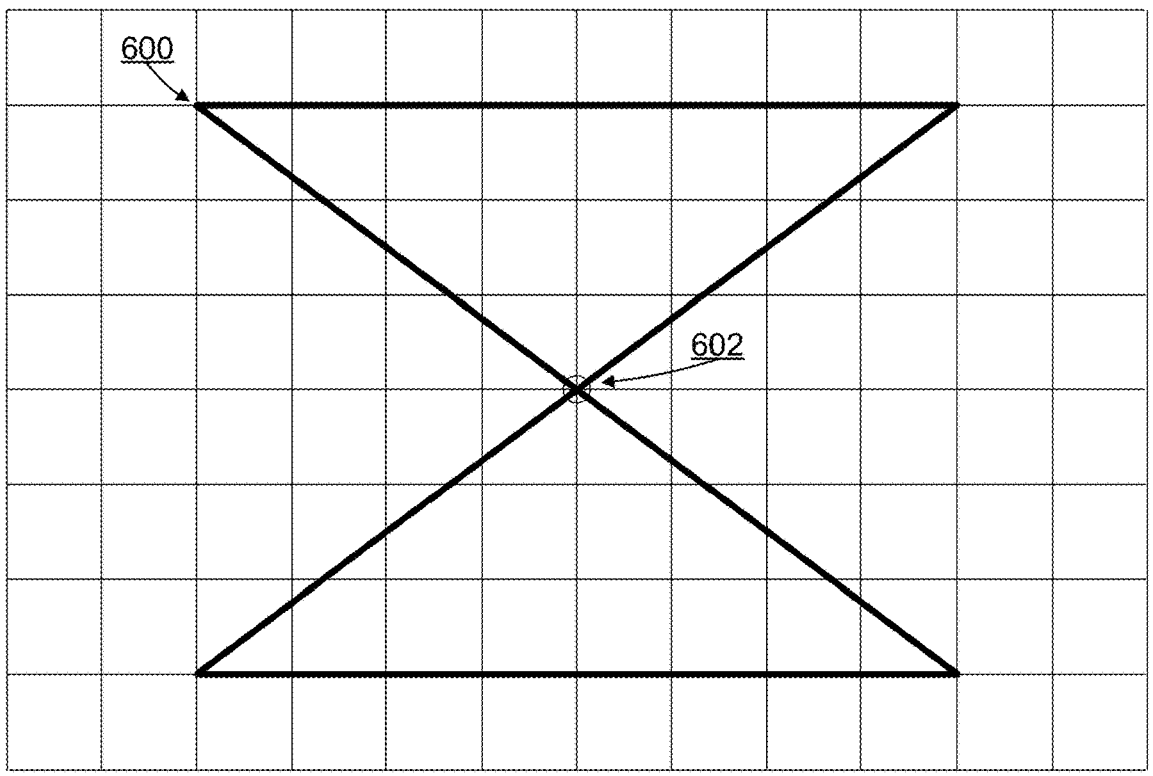
FIGS. 6A and 6B illustrate an example process for topology correction for a polygon ring containing a self-intersection, according to one embodiment.

FIG. 6A illustrates an example of a single polygon ring 600 that includes a self-intersection at point 602. In this example, the topology correction module 122 is tasked with encoding polygon ring 600 such that the top triangle and bottom triangle are individual polygons rather than a single invalid polygon that contains a self-intersection at point 602. In order to generate these two polygons, the topology correction module 122 uses polygon point data 136 describing the polygon ring to select paths along each edge that result in two CCW winding order encodings (e.g., top and bottom polygons).

Figure 6B:
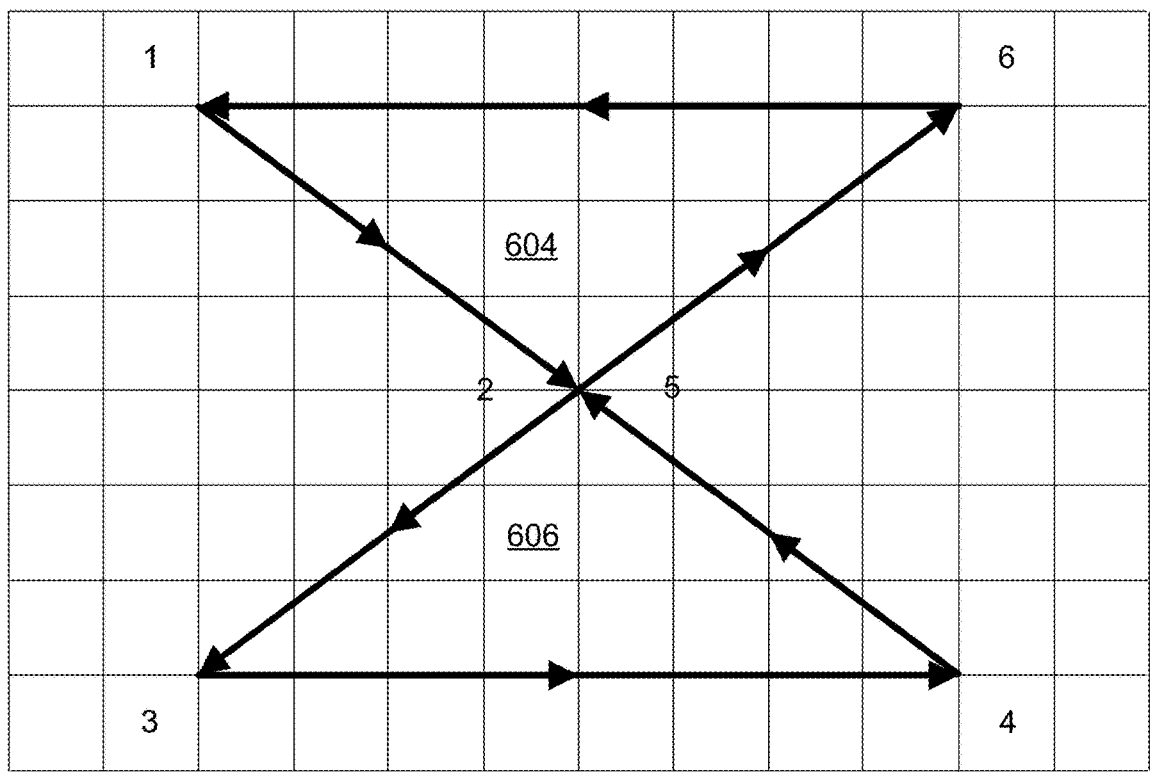

FIG. 6B illustrates an example process by which the topology correction module 122 encodes each edge of polygon ring 600 with the correct winding order. In this example, the topology correction module 122 begins at position 1 (top left corner of FIG. 6B) and encodes points forming an edge to position 2. However, position 2 shares a point with position 5. If the topology correction module 122 continues encoding the path through position 2 toward position 3 (and subsequently to positions 4, 5, 6, and return to 1), the topology correction module 122 would generate an invalid self-intersecting polygon. In this example, the top portion 604 of the polygon and the bottom portion 606 of the polygon form a single invalid polygon. Conversely, if the topology correction module 122 selects position 6 from position 2 (rather than position 3), and returns to position 1, a valid polygon 604 is created by encoding a CCW winding order comprised of positions 1, 5, 6, and back to position 1. Similarly, the topology correction module 122 creates a second valid polygon 606 by encoding a CCW winding order comprised of positions 2, 3, 4, and back to 2.

Figure 7A:
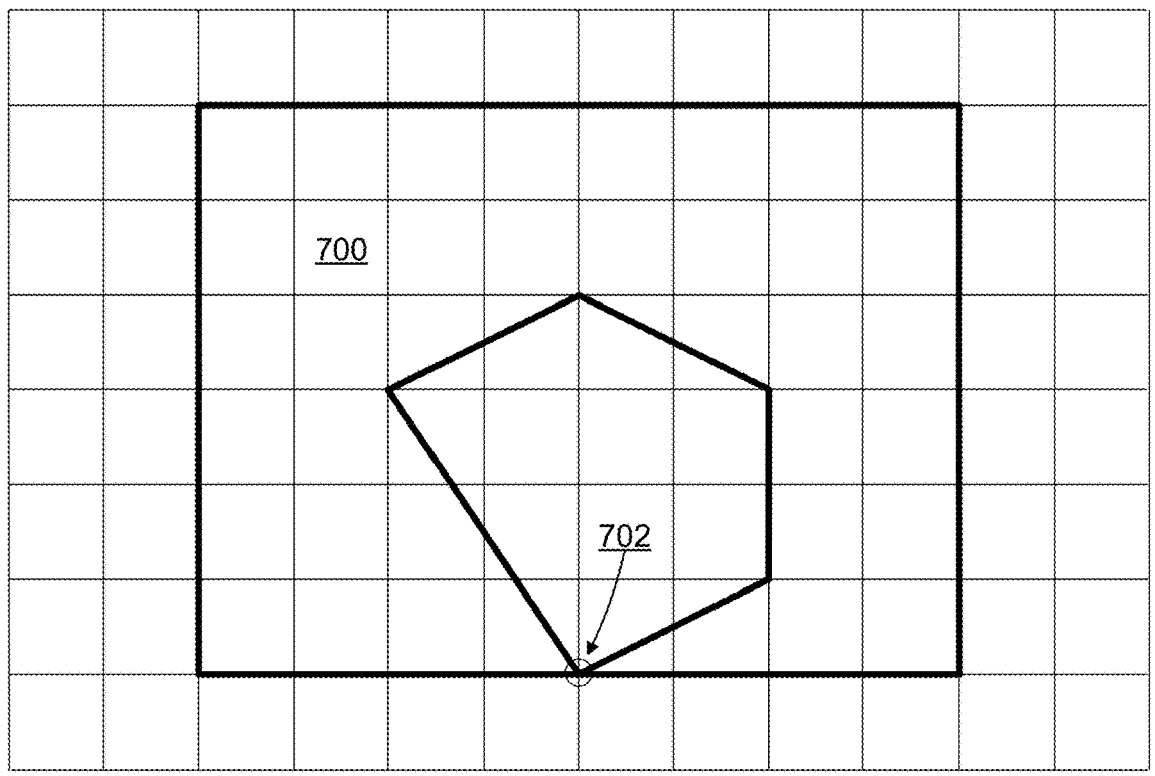
FIGS. 7A and 7B illustrate an example process for topology correction for a polygon ring containing a self-intersection, according to one embodiment.

FIG. 7A illustrates an example of a single polygon ring 700 that includes a self-intersection at point 702. In this example, the topology correction module 122 ensures that the rendered output is valid by selecting the correct path that generates two polygon rings of opposite winding order (e.g., CCW and CW). That is, the topology correction module 122 corrects invalid polygon ring 700 by separating it into two polygon rings with opposite winding orders such that one polygon ring contains, or owns, the other polygon ring and they touch at one discrete point 702.

Figure 7B:
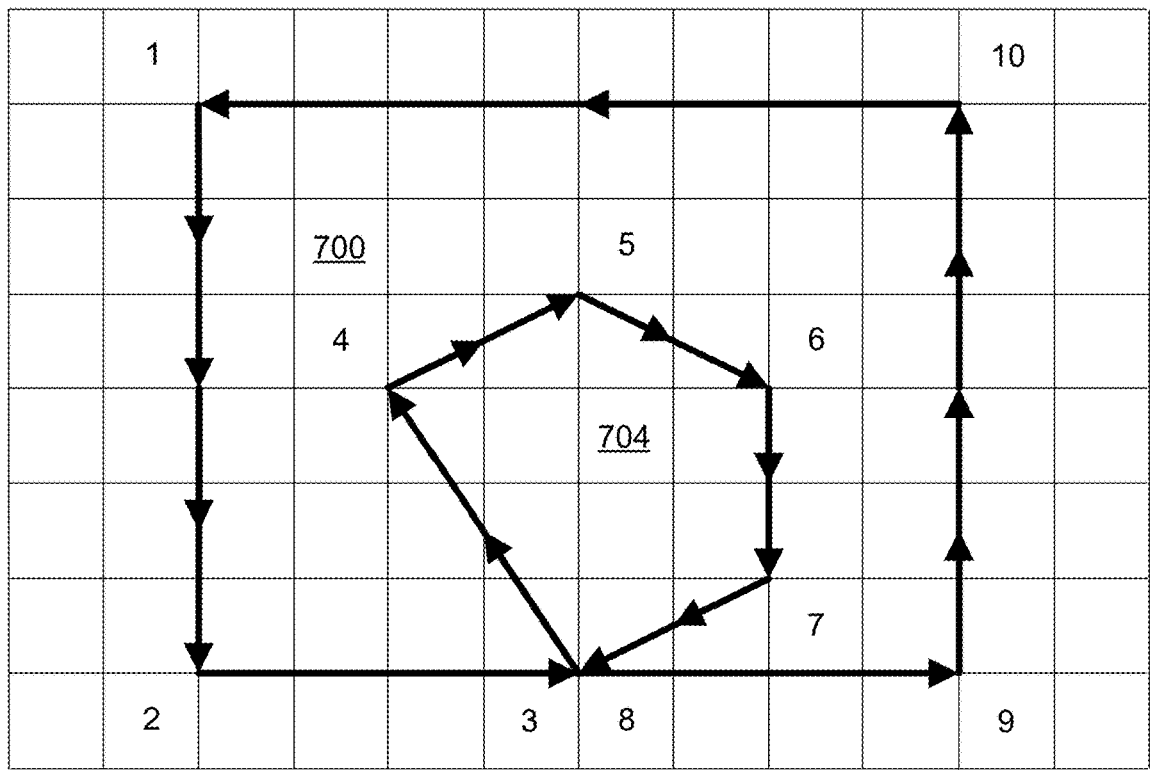

As shown in the example in FIG. 7B, the topology correction module 122 begins encoding polygon ring 700 at position 1 and continues to positions 2 and 3. However, position 3 is shared by position 8. If the topology correction module 122 continued the encoding order to positions 4, 5, 6, 7, 8, 9, 10, and back to 1, this would produce an invalid polygon ring 700 that self-intersects at discrete point 702. Rather, the topology correction module 122 uses polygon point data 136 to swap next position 4 with position 9 to encode one polygon ring 700 of CCW winding order comprised of positions 1, 2, 8, 9, 10, and back to position 1. Similarly, the topology correction module 122 encodes a second polygon ring 704 with a CW winding order comprised of positions 3, 4, 5, 6, 7, and back to position 3. By encoding polygon ring 700 in this manner, the topology correction module 122 generates valid rendered output in that the winding order of the interior ring is opposite to that of the exterior ring. This results in a single polygon with a hole touching the bottom edge.

Polygon Ring Including Chain of Rings

Figure 8A:
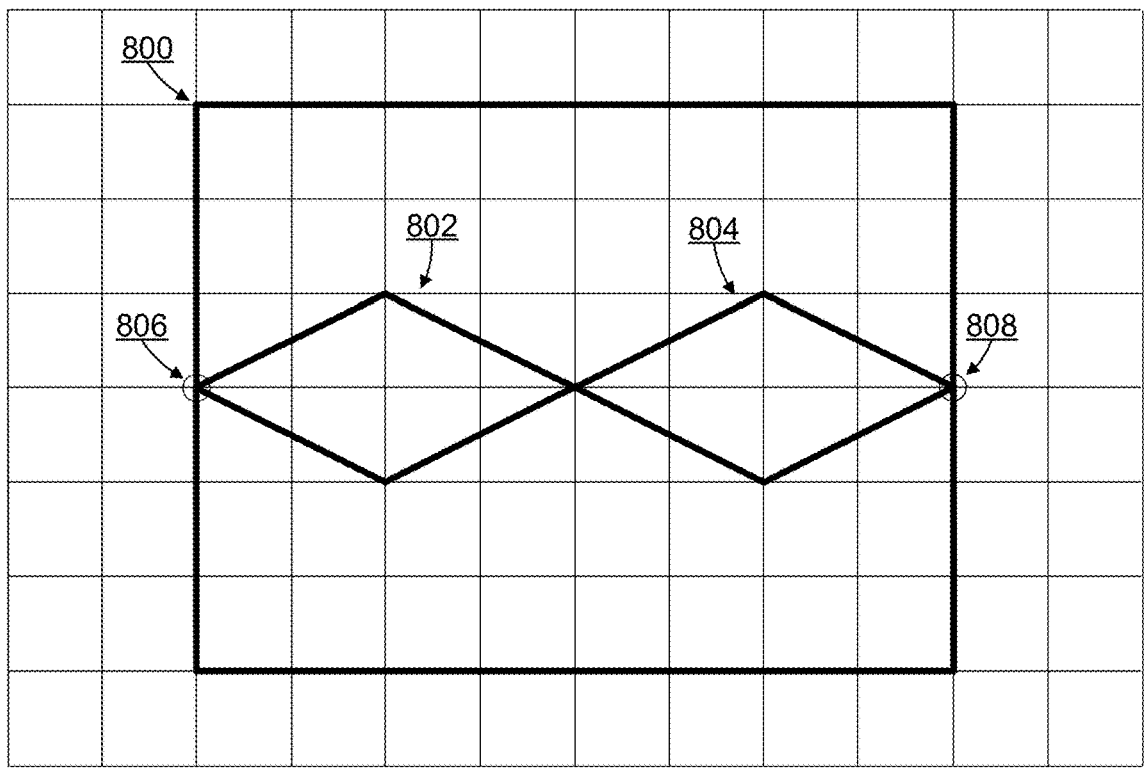
FIGS. 8A and 8B illustrate an example process for topology correction for a polygon ring containing a chain of holes, according to one embodiment.

FIG. 8A illustrates an example of a single exterior ring 800 that includes a chain of interior rings 802 and 804 that intersect with exterior ring 800 at discrete points 806 and 808, respectively. In this example, the topology correction module 122 ensures that the rendered output is valid by selecting appropriate paths resulting in two polygons (e.g., top and bottom polygons) separated by a cavity in the middle.

Figure 8B:
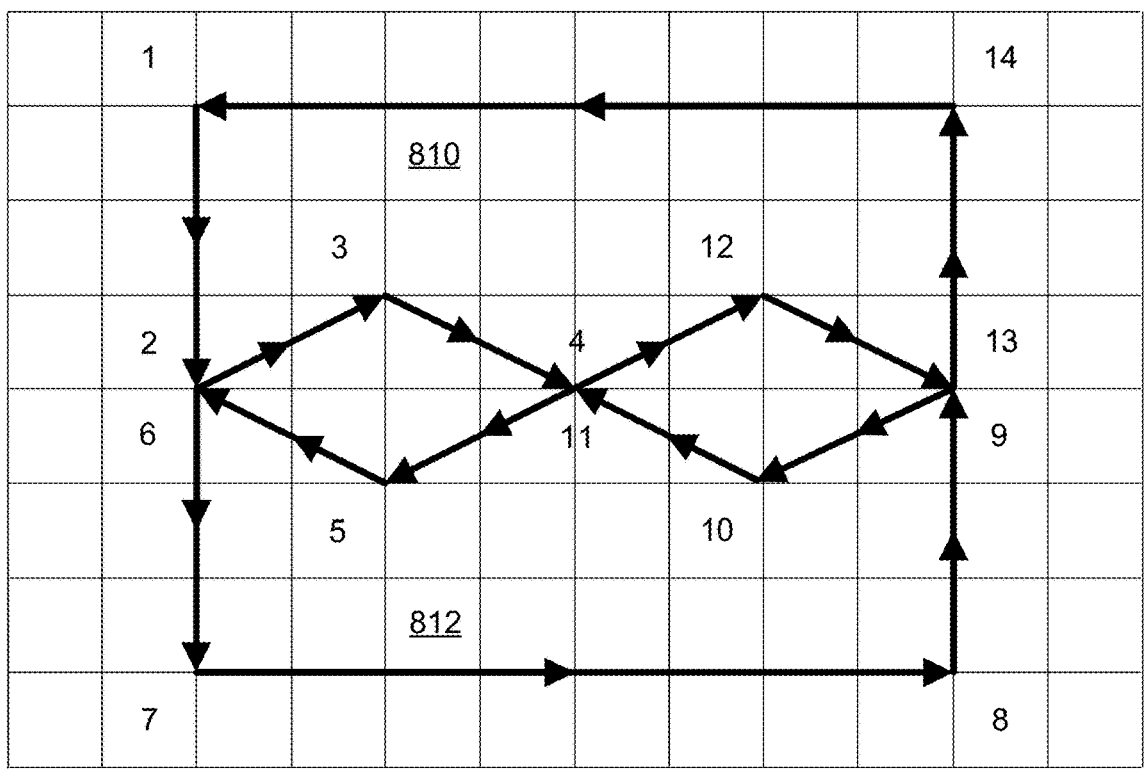

FIG. 8B illustrates an example process by which the topology correction module 122 encodes each edge of polygon ring 800 with the correct winding order. In order to create two polygons in this example, the topology correction module 122 begins at position 1 and encodes an edge to position 2. However, position 2 is shared by position 6. If the topology correction module 122 continued encoding an edge to positions 7, 8, 13, 14, and back to position 1, the result would be a single invalid polygon with holes comprised of positions 2, 3, 4, 5, and back to position 2, and positions 4, 12, 13, 10, and back to position 4, respectively. Rather, the topology correction module 122 divides polygon ring 800 into two polygons rings 810 and 812. The topology correction module 122 encodes a CCW winding order comprised of positions 1, 2, 3, 4, 12, 13, 14, and back to position 1 to produce an exterior ring 810. Similarly, the topology correction module 122 encodes an additional CCW winding order consisting of positions 6, 7, 8, 9, 10, 11, 5, and back to position 6, resulting in a second exterior ring 812. Thus, polygons 810 and 812 are rendered as separate solid polygons with a cavity in between them.

Process for Correcting Polygon Ring Topography

FIG. 9 illustrates a process for correcting polygon ring topology, according to one embodiment. In the embodiment illustrated in FIG. 9, the polygon encoding module 120 receives 910 a first set of points defining a first polygon, or "subject polygon." In addition, the polygon encoding module 120 receives 920 a second set of points defining a second polygon, or "operating polygon." The polygon encoding module 120 determines 930 a set of hot pixels describing points within the first polygon that include points of possible intersecting bounds and points comprising the vertices of the first polygon. Based on the set of hot pixels, the polygon encoding module 120 operates 940 on the first polygon with the second polygon to generate one or more polygon rings consisting of a set of points. The topology correction module 122 corrects 950 the topology associated with the one or more rings, such as polygons that intersect themselves, polygons that intersect each other, polygons that include a chain of holes, and/or polygons that include complex intersections. The topology correction module 122 provides 960 the corrected polygon rings to the display device in the client map application 108.

Alternative Embodiments

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A method for drawing valid polygons on a display device, the method comprising:
   receiving a first set of points defining a subject polygon;
   receiving a second set of points defining an operating polygon;
   determining a set of one or more hot pixels each corresponding to a location where a bound of the subject polygon and a bound of the operating polygon intersect or are within a threshold distance of intersecting;
   for at least one hot pixel in the set of one or more hot pixels:
      identifying an integer coordinate closest to the location of the hot pixel; and
      reassigning points of the first set of points corresponding to the bound of the subject polygon and points of the second set of points corresponding to the bound of the operating polygon such that each respective bound passes through the identified integer coordinate;
   performing a polygon Boolean operation on the subject polygon with the operating polygon to generate one or more resulting polygons each comprising an exterior polygon ring and one or more interior polygon rings comprising a third set of points, wherein performing the Boolean operation on the subject polygon with the operating polygon is based on a Boolean operation type, the Boolean operation type including one of: union, intersection, difference, and exclusive-or (XOR);
   correcting a topology associated with the one or more resulting polygons such that a winding order of the one or more interior polygon rings is opposite that of the exterior polygon ring of each resulting polygon; and
   providing, to the display device, the one or more corrected resulting polygons.

2. The method of claim 1, wherein correcting the topology associated with the one or more resulting polygons comprises:
   determining an invalid polygon ring of the one or more resulting polygons includes a self-intersection;
   separating the invalid polygon ring to generate two or more valid polygon rings, wherein each valid polygon ring comprises a non-intersecting portion of the invalid polygon ring; and
   replacing the invalid polygon ring with the two or more valid polygon rings.

3. The method of claim 2, wherein separating the invalid polygon ring comprises:
   identifying, based on the self-intersection, a plurality of intersecting points;
   processing each intersection point of the plurality of intersecting points to determine an updated intersection point to which the intersection point connects; and
   connecting, based on the updated intersection point, each intersection point of the plurality of intersecting points to generate the two or more valid polygon rings.

4. The method of claim 1, wherein correcting the topology associated with the one or more resulting polygons comprises:
   determining an invalid polygon ring of the one or more interior polygon rings includes a chain of holes;
   separating the chain of holes to generate two or more valid polygon rings, wherein the two or more valid polygon rings correspond to two or more holes in the chain of holes; and
   replacing the invalid polygon ring with the two or more valid polygon rings.

5. The method of claim 1, wherein correcting the topology associated with the one or more resulting polygons comprises:
   determining an invalid polygon ring of the one or more resulting polygons includes a spike;
   snipping the spike to generate a valid polygon ring; and
   replacing the invalid polygon ring with the valid polygon ring.

6. The method of claim 1, wherein correcting the topology associated with the one or more resulting polygons comprises correcting a winding order of the one or more polygon rings that comprise the one or more resulting polygons, wherein the winding order describes an order in which a set of discrete points comprising each of the one or more polygon rings is encoded.

7. The method of claim 6, wherein a counter-clockwise winding order generates a solid polygon and a clockwise winding order generates a hole.

8. The method of claim 1, wherein the one or more corrected resulting polygons define a shape of a map feature of an electronic map.

9. A non-transitory computer readable storage medium having instructions encoded thereon that, when executed by a processor, cause the processor to perform steps comprising:
receiving a first set of points defining a subject polygon;
receiving a second set of points defining an operating polygon;
determining a set of one or more hot pixels each corresponding to a location where a bound of the subject polygon and a bound of the operating polygon intersect or are within a threshold distance of intersecting;
for at least one hot pixel in the set of one or more hot pixels:
identifying an integer coordinate closest to the location of the hot pixel; and
reassigning points of the first set of points corresponding to the bound of the subject polygon and points of the second set of points corresponding to the bound of the operating polygon such that each respective bound passes through the identified integer coordinate;
performing a polygon Boolean operation on the subject polygon with the operating polygon to generate one or more resulting polygons each comprising an exterior polygon ring and one or more interior polygon rings comprising a third set of points, wherein performing the Boolean operation on the subject polygon with the operating polygon is based on a Boolean operation type, the Boolean operation type including one of: union, intersection, difference, and exclusive-or (XOR);
correcting a topology associated with the one or more resulting polygons such that a winding order of the one or more interior polygon rings is opposite that of the exterior polygon ring of each resulting polygon; and
providing, to a display device, the one or more corrected resulting polygons.

10. The non-transitory computer readable storage medium of claim 9, wherein correcting the topology associated with the one or more resulting polygons comprises:
determining an invalid polygon ring of the one or more resulting polygons includes a self-intersection;
separating the invalid polygon ring to generate two or more valid polygon rings, wherein each valid polygon ring comprises a non-intersecting portion of the invalid polygon ring; and
replacing the invalid polygon ring with the two or more valid polygon rings.

11. The non-transitory computer readable storage medium of claim 10, wherein separating the invalid polygon ring comprises:
identifying, based on the self-intersection, a plurality of intersecting points;
processing each intersection point of the plurality of intersecting points to determine an updated intersection point to which the intersection point connects; and
connecting, based on the updated intersection point, each intersection point of the plurality of intersecting points to generate the two or more valid polygon rings.

12. The non-transitory computer readable storage medium of claim 9, wherein correcting the topology associated with the one or more resulting polygons comprises:
determining an invalid polygon ring of the one or more interior polygon rings includes a chain of holes;
separating the chain of holes to generate two or more valid polygon rings, wherein the two or more valid polygon rings correspond to two or more holes in the chain of holes; and
replacing the invalid polygon ring with the two or more valid polygon rings.

13. The non-transitory computer readable storage medium of claim 9, wherein correcting the topology associated with the one or more resulting polygons comprises:
determining an invalid polygon ring of the one or more resulting polygons includes a spike;
snipping the spike to generate a valid polygon ring; and
replacing the invalid polygon ring with the valid polygon ring.

14. The non-transitory computer readable storage medium of claim 9, wherein correcting the topology associated with the one or more resulting polygons comprises correcting a winding order of the one or more polygon rings that comprise the one or more resulting polygons, wherein the winding order describes an order in which a set of discrete points comprising each of the one or more polygon rings is encoded.

15. The non-transitory computer readable storage medium of claim 14, wherein a counter-clockwise winding order generates a solid polygon and a clockwise winding order generates a hole.

16. The non-transitory computer readable storage medium of claim 9, wherein the one or more corrected resulting polygons define a shape of a map feature of an electronic map.

* * * * *